United States Patent
Cawley

(12) 
(10) Patent No.: US 6,504,093 B1
(45) Date of Patent: Jan. 7, 2003

(54) AIRCRAFT CABLE RACEWAY

(75) Inventor: John Edward Cawley, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/043,997

(22) Filed: Jan. 11, 2002

(51) Int. Cl.⁷ .................................. H02G 3/10
(52) U.S. Cl. .................... 174/48; 174/49; 174/60; 174/67; 174/68.3; 174/95; 174/99 R; 220/3.2; 220/3.3; 220/3.8; 220/4.01; 220/4.02; 52/220.1; 52/220.3; 52/220.5; 52/220.7
(58) Field of Search ................ 174/48, 49, 60, 174/67, 68.3, 95, 99 R; 138/89; 220/3.2, 3.3, 3.8, 4.01, 4.02; 52/220.1, 220.3, 220.5, 220.7; 439/207

(56) References Cited

U.S. PATENT DOCUMENTS 4,723,580 A * 2/1988 Trautwein .................... 138/163
4,857,670 A * 8/1989 Frank et al. ................. 138/166
6,084,180 A * 7/2000 DeBartolo et al. .......... 174/101

* cited by examiner

*Primary Examiner*—Anthony Dinkins
*Assistant Examiner*—Anton Harris
(74) *Attorney, Agent, or Firm*—Harness, Dickey & Pierce, P.L.C.

(57) ABSTRACT

A cabling apparatus that is easily retrofitted into the cabin of an aircraft for allowing containment and routing of cabling. The cabling apparatus is integrated into an interior compartment of an aircraft and may be adjacent to a seat of the aircraft. The cabling apparatus comprises a cylindrical housing comprising a flexible material with a longitudinal opening along its length, thus providing two opposing edges to the opening. The opposing edges comprise first and second locking connectors for inter-engaging to lock the opening of the cabling apparatus. When the first and second locking connectors are urged into engagement the cabling apparatus is locked in a closed position such that cabling contained therein cannot be removed or accessed. In one embodiment the cabling apparatus is affixed to a cabin floor of the aircraft by a fastener. In a second preferred embodiment the cabling apparatus is affixed to the cabin floor by a depending member that helps to form a channel that accepts the edge of carpeting on the cabin floor.

13 Claims, 1 Drawing Sheet

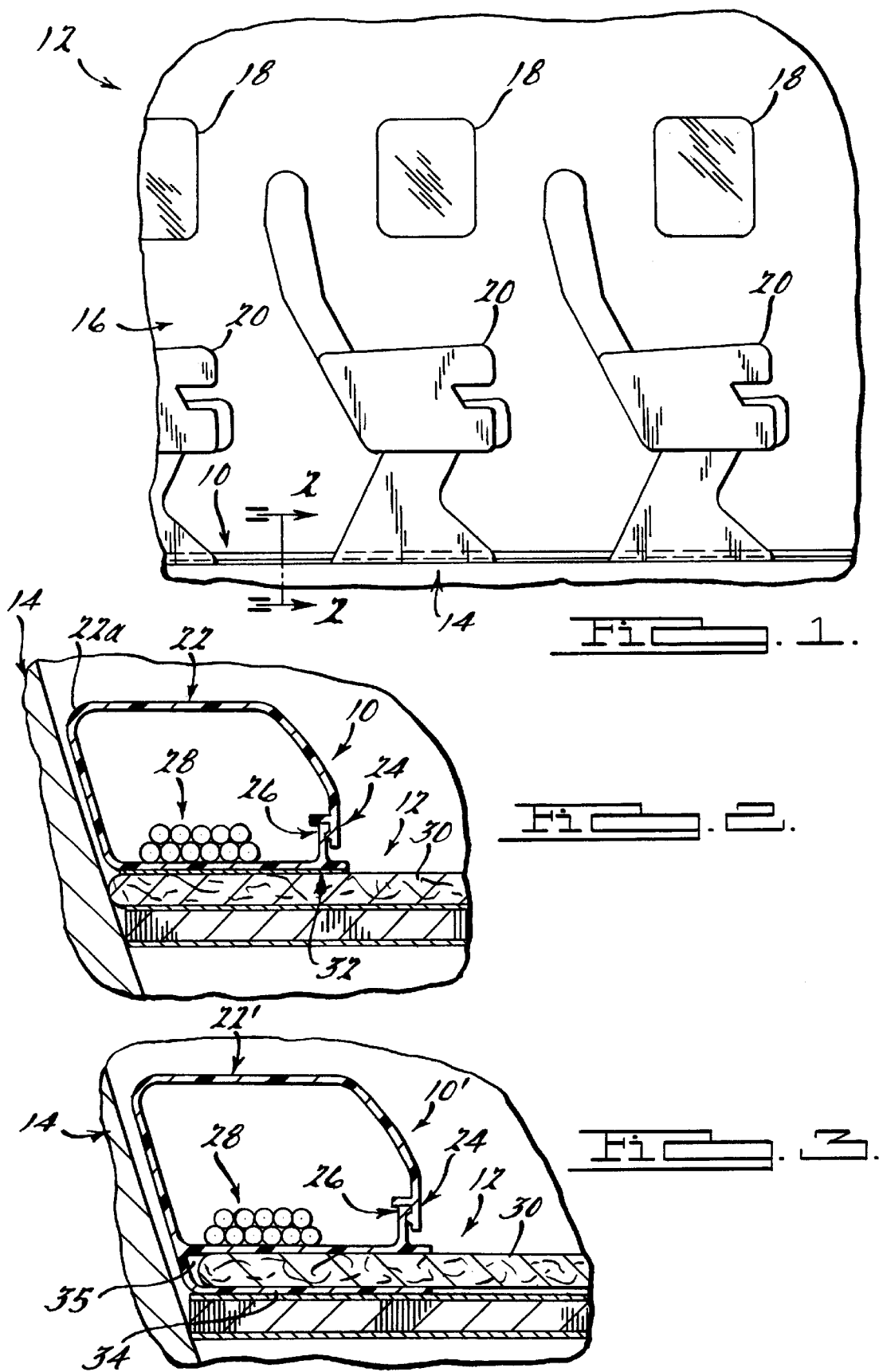

AIRCRAFT CABLE RACEWAY

FIELD OF THE INVENTION

The present invention relates generally to cable raceways, and more specifically to a cable raceway adapted to be easily integrated into the cabin of an aircraft for allowing installation of cabling.

BACKGROUND OF THE INVENTION

Airline passengers frequently bring on-board an aircraft their portable electronic devices including laptop computers, hand-held computers and cellular telephones or pagers with Internet access capability. These various electronic devices can be used by passengers to perform a wide variety of computing operations including reviewing web pages, gathering information, creating documents and performing other work or leisure related activities. These devices are convenient for use during a commercial air flight where several hours can pass between destinations. Due to the proliferation of electronic devices, systems have developed to integrate their use in areas where they have not been fully utilized, such as on commercial aircraft.

For commercial aircraft, greater utilization has developed by integrating a local area network (LAN) in the commercial aircraft to allow for connecting the computerized devices to the network in order to access additional services. An example of an aircraft based information network is the "Connexion By Boeing[SM]" system. Connexion By Boeing[SM] is a consumer and commercial airline service that offers high-speed data communication services through a space-based network. The system offers air travelers high-speed intranet, email, and Internet services while in-flight. To use these services, a passenger connects their electronic device to a network on the aircraft that in turn places the user's electronic device in communication, via a space based communication link, with a ground based component of the system.

Electronic devices, however, require power for operation and connectivity to a network in order to access additional services or resources such as the Connexion By Boeing[SM] system. Network and power connectivity options include integrating a connector module with power and/or network outlets into the passenger cabin in association with, or directly integrated into, an aircraft passenger seat. This provides for easy and convenient connection of an electronic device to a connector module for allowing network and power connectivity. A connector module solution, however, requires passing cabling from a power source and a network source to the connector module. This is difficult in an onboard aircraft environment due to limited space and added weight concerns. Further, additional cabling should be separate from other aircraft wiring in order to avoid any adverse consequences due to the close proximity of cabling with other essential aircraft wiring. Also, any solution must allow for retrofitting existing aircraft. Finally, any solution should allow for easily changing the cabling in the event of a change in the technology of the network and/or power source such that new cabling is required.

Since the technology of electronic devices is continually evolving, the possibility of changing the cabling over the lifetime of the aircraft is real. Therefore, there is a need for a cabling apparatus comprising a cable raceway adapted to be easily retrofitted into a cabin of an aircraft to allow for easy installation of cabling in the aircraft in order to facilitate network and power connectivity of electronic devices.

It is therefore an object of the invention to provide a cabling apparatus that solves the above identified problems and fulfills the above identified requirements. This includes the object of allowing the installation of cabling in the cabin of an aircraft for connecting electronic devices to a power source and/or a network. It further includes the object of providing a cabling apparatus that can easily be integrated in the cabin of an aircraft and allow for the easy installation of cabling.

SUMMARY OF THE INVENTION

According to the invention, there is provided a cabling apparatus in accordance with a preferred embodiment of the present invention for retrofitting into the cabin of an aircraft to allow for the installation of cabling in the aircraft. The cabling apparatus is integrated into an interior compartment of the aircraft at the juncture of the cabin wall and floor of the aircraft. The cabling apparatus comprises a cylindrical housing comprising a flexible material with an opening extending through the length of the cylindrical housing, thus providing opposing sides to the opening. The opposing sides comprise first and second locking connectors for locking the opening of the cabling apparatus closed. When the first and second locking connectors are urged into engagement the cabling apparatus is locked in a closed position. Thus, the cabling apparatus is adapted to conform to the juncture of the cabin wall and cabin floor in a location that does not interfere with walk ways thus allowing for a larger size of the cabling apparatus in order to hold additional cabling.

In implementation, the cabling apparatus is provided in suitable lengths for installing cabling in the interior compartment of an aircraft. The cabling apparatus is affixed to the flooring of the aircraft adjacent to passenger seating and along the wall of the cabin. Cabling is placed in the cabling apparatus and the first and second locking connectors are urged together to thus lock the cabling apparatus closed with the cabling inside. An end of the cabling is connected to the connector module for allowing the connection of portable electronic devices.

BRIEF DESCRIPTION OF THE DRAWINGS

The present invention will become more fully understood from the detailed description and the accompanying drawings, wherein:

FIG. 1 is a side view of a portion of an aircraft cabin illustrating the cabling apparatus disposed adjacent a wall of the cabin and in close proximity to the aircraft seats;

FIG. 2 is a cross sectional end view of the cabling apparatus of FIG. 1 taken in accordance with section line 2—2 in FIG. 1 illustrating the apparatus secured to carpeting on the floor of the cabin of the aircraft; and FIG. 3 is a cross sectional end view of the a cabling apparatus in accordance with an alternative preferred embodiment of the present invention showing the apparatus secured to the floor of the cabin of the aircraft by an integrally formed slotted portion of the apparatus.

DETAILED DESCRIPTION OF THE PREFERRED EMBODIMENTS

The following description of the preferred embodiment(s) is merely exemplary in nature and is in no way intended to limit the invention, its application, or uses.

In FIG. 1, a cabling apparatus 10 in accordance with a preferred embodiment of the present invention is shown. The cabling apparatus 10 is illustrated in an aircraft cabin 12 with a cabin floor 14, cabin wall 16, cabin windows 18, and aircraft passenger seats 20, and with the apparatus 10 positioned against the cabin floor 14 and closely adjacent the cabin wall 16. It will be appreciated, however, that the apparatus 10 could just as easily be disposed on the cabin wall 16 or at other locations within the cabin 12 where it might be even more convenient to locate than on the cabin floor 14.

Referring to FIG. 2, the cabling apparatus 10 comprises a cylindrical housing 22. The cylindrical housing 22 is integrally formed from a suitable material to enable it to conform to the contour of the cabin floor 14 and the cabin wall 16. In one preferred embodiment this material comprises a suitably high strength yet flexible plastic. If manufactured from such a plastic, the cabling apparatus 10 may be formed from a well known existing process. The cylindrical housing 22 comprises a first locking connector 24 and a second locking connector 26. The connectors 24 and 26 are shown in a locked or closed position. The first locking connector 24, when urged into contact with the second locking connector 26, prevents the cylindrical housing 22 of the cabling apparatus 10 from opening. When separated, the locking connectors 24 and 26 each define an edge, with the area between them forming a longitudinally extending opening or slot. Corner 22a is sufficiently thin to permit the first locking connector 24 to be lifted away from the second locking connector 26 when the two connectors are disengaged from each other. Thus, the cabling apparatus 10 provides a secure repository for cabling 28 within the cylindrical housing 22. Advantageously the cabling 28 is maintained apart form other cabling not used to provide connectivity to the user electronic devices to thereby help reduce the possibility of RF interference or strong magnetic fields interfering with signals transmitted over the cabling 28.

In one preferred embodiment, the cylindrical housing 22 of the cabling apparatus 10 is affixed to the cabin floor 14 by a fastener 32. The cabin floor 14 of the aircraft cabin 12 comprises carpeting 30. The fastener 32 is attached on one surface to the bottom of the cylindrical housing 22 of the cabling apparatus 10, and on the opposite surface to the carpeting 30. The fastener 32 is of suitable material to fasten the cylindrical housing 22 to the carpeting 30 of the cabin floor 14. The fastener 32 comprises a plurality of miniature hooks perpendicularly disposed in the base of the fastener 32. The miniature hooks, when urged into contact with loops of material in the carpeting 30, secures the cylindrical housing 22 against the cabin floor 14. For example, Velcro™ fastening material could be used as the fastener 32. The Velcro™ material would be affixed to the bottom of the cylindrical housing 22 with the hooks of the Velcro™ material positioned to engage the carpeting 30 of the cabin floor 14. The use of a fastener 32 (e.g. Velocro™ material) advantageously allows for easy installation and retrofitting of the aircraft cabin 12 with the cabling apparatus 10.

Now referring to FIG. 3 a second preferred embodiment of the cabling apparatus 10' provides an alternative to the fastener 32 of FIG. 2 for fixating the cabling apparatus 10' to the cabin floor 14. The cylindrical housing 22' is connected to a slotted member 34 underneath the cylindrical housing 22'. The slotted member 34 forms a channel 35 having a width sufficient to allow the insertion of an edge of carpeting 30 into the slot created by the slotted member 34. The slotted member 34 advantageously allows for easy installation or retrofitting the aircraft cabin 12 with the cabling apparatus 10 by lifting the edge of the carpeting 30 and inserting it into the channel 35 formed by the slotted member 34.

The various preferred embodiments of the cabling apparatus 10 and 10' of the present invention, and the ability to easily adapt the cabling apparatus for mounting adjacent various areas of an aircraft cabin 12, thus allows easy installation or retrofitting of the cabling apparatus 10 and 10'. The cabling apparatus 10 and 10' of the present invention is unobtrusive, easily installable, and does not require significant modifications to existing aircraft. Importantly, the apparatus 10 and 10' allow cabling associated with the on-board network for communicating with user computing devices to be kept separate from other cabling associated with various subsystems of the aircraft 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cabling apparatus adapted to be easily integrated into an interior compartment of a mobile platform for retrofitting the mobile platform with cabling, the cabling apparatus comprising:

a cylindrical housing adapted to contain cabling therein;

said cylindrical housing having an opening extending along a length of the cylindrical housing thus providing a first opposing edge and a second opposing edge wherein the first opposing edge comprises a first locking connector and the second opposing edge comprises a second locking connector, wherein the first locking connector opposes the second locking connector;

wherein the first locking connector, when urged into engagement with the second locking connector, closes the opening of the cylindrical housing and restricts reopening the cylindrical housing; and whereby the cabling apparatus is adopted to conform to the interior compartment of the mobile platform thus allowing for easy installation of the cabling apparatus and easy installation of cabling within the cabling apparatus.

2. The cabling apparatus of claim 1, wherein the cylindrical housing further comprises a flat surface for conforming to a flat surface of a floor of the interior compartment of the mobile platform.

3. The cabling apparatus of claim 1, further comprising a fastener for fastening the cabling apparatus to a carpeted surface in the interior compartment of the aircraft.

4. The cabling apparatus of claim 3, wherein the fastener comprises a fastening surface with a plurality of miniature hooks made of a flexible material, disposed perpendicularly in the fastening surface wherein the miniature hooks are adapted to engage the carpeted surface and hold the cabling apparatus to the carpeted surface.

5. The cabling apparatus of claim 1, further comprising a depending member forming a channel adjacent said cylindrical housing, said channel being suitable for receiving an edge of a floor covering.

6. A cabling apparatus adapted to be easily integrated into an interior compartment of an aircraft for retrofitting the aircraft with additional cabling needed to communicate with personal electronic devices of passengers and crew members of the aircraft, said cabling apparatus comprising:

an integrally formed, elongated cylindrical housing within which cabling needed for communicating with said personal electronic devices may be contained;

said housing having first and second locking connectors formed along opposing, longitudinally extending edges of said housing, said locking connectors, when separated, defining a slot through which said cabling may be inserted, and when engaged with one another in a locked orientation preventing said cabling from being removed from said apparatus; and wherein said apparatus is formed from a material sufficiently flexible to permit said apparatus to conform to a surface of said interior of said aircraft.

7. The apparatus of claim 6, further comprising a depending member forming a channel disposed longitudinally along said housing, said channel being adapted to receive an edge of a floor covering to thereby hold said apparatus stationary within said aircraft.

8. The apparatus of claim 6, further comprising a fastener secured to one surface of said cylindrical housing, said fastener including a plurality of hook portions for allowing said housing to be anchored to a floor covering of said aircraft.

9. The apparatus of claim 7, wherein said depending member is integrally formed with said housing.

10. The apparatus of claim 7, wherein said channel is coextensive with said housing.

11. A cabling apparatus adapted to be easily integrated into an interior compartment of an aircraft for retrofitting the aircraft with additional cabling needed to communicate with personal electronic devices of passengers and crew members of the aircraft, said cabling apparatus comprising:

an integrally formed, elongated cylindrical housing within which cabling needed for communicating with said personal electronic devices may be contained;

said housing having first and second locking connectors formed along opposing, longitudinally extending edges of said housing, and a corner sufficiently flexible to permit one of said edges to be lifted away from the other when said connectors are not engaged with each other to define a slot to permit insertion of said cabling into an interior area of said housing;

said locking connectors, when engaged with one another in a locked orientation, preventing said cabling from being removed from said housing;

wherein said apparatus is formed from a material sufficiently flexible to permit said housing to conform to a surface of said interior of said aircraft; and a fastening component for securing said housing to an interior surface of said interior compartment.

12. The apparatus of claim 11, wherein said fastening component comprises a pad having a first surface which is secured to an outer surface of said housing, and a second surface comprising hook type elements for engaging said interior surface of said aircraft.

13. The apparatus of claim 11, wherein said interior surface forms a section of carpeting, and wherein said housing includes a depending member forming a channel coextensive with a longitudinal length of said housing, said channel being adapted to receive an edge of said carpeting such that said housing is held stationary by said carpeting.

* * * * *